United States Patent [19]

Wright

[11] 4,065,167
[45] Dec. 27, 1977

[54] SAFETY ENCLOSURE FOR MINING MACHINES

[76] Inventor: Newton E. Wright, P.O. Box 884, Lebanon, Va. 24266

[21] Appl. No.: 723,736

[22] Filed: Sept. 16, 1976

[51] Int. Cl.$^2$ ............................................. B62D 27/06
[52] U.S. Cl. ................................... 296/28 C; 175/219; 180/77 MC; 280/748; 280/756; 296/102; 299/12
[58] Field of Search .............................. 296/28 C, 102; 180/77 MC, 89.12; 280/748, 753, 756, 770; 175/219; 299/12

[56] References Cited

U.S. PATENT DOCUMENTS

| | | | |
|---|---|---|---|
| 3,402,941 | 9/1968 | Martinmaas | 280/748 |
| 3,713,688 | 1/1973 | Monroe | 280/756 |
| 3,865,197 | 2/1975 | McCormick | 175/219 |
| 3,937,517 | 2/1976 | Donovan | 296/68 |
| 4,022,026 | 5/1977 | Childress | 175/219 |

*Primary Examiner*—Philip Goodman
*Assistant Examiner*—John A. Carroll

*Attorney, Agent, or Firm*—Melville, Strasser, Foster & Hoffman

[57] ABSTRACT

A safety enclosure for use with underground mining machinery for protecting the operator of the machinery from overhead and lateral falls and the like. The safety enclosure comprises a cage-like structure of generally rectangular cross section for receiving and surrounding the operator while operating the machine. A pair of longitudinal male slide members are vertically secured to the cage-like structure along one side thereof, the slide members being slidably mateable with a pair of cooperating female channel members vertically secured along one side of the mining machine. Shear pins are provided for adjustably maintaining, under normal operating conditions, the cage-like male slide members assembly disposed above the mine floor by a preselected distance and for releasing the assembly for sliding displacement to the floor of the mine in response to an overhead fall causing a predetermined force on the top of the enclosure.

7 Claims, 14 Drawing Figures

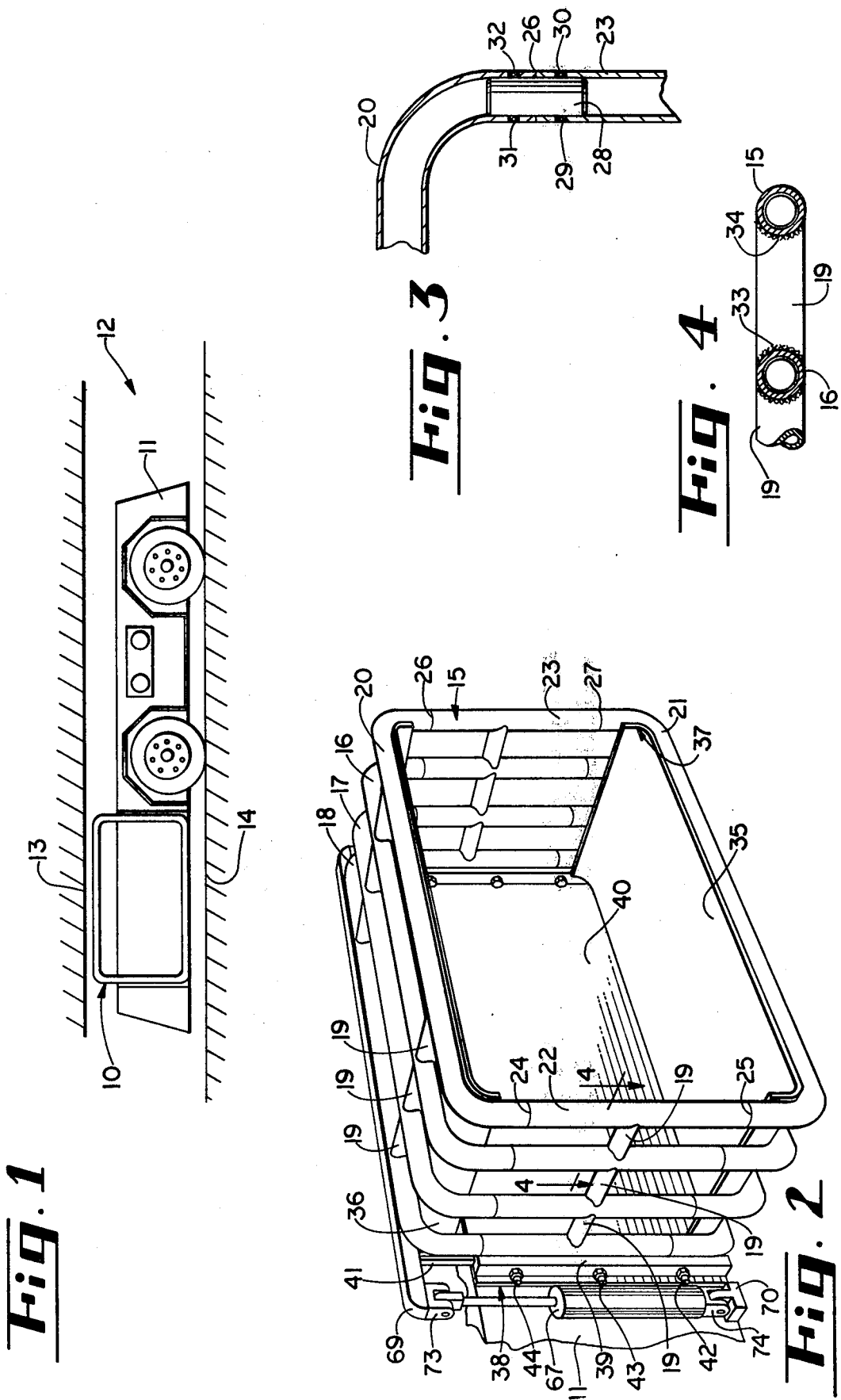

SAFETY ENCLOSURE FOR MINING MACHINES

BACKGROUND OF THE INVENTION

The apparatus of the present invention relates generally to the field of personnel safety and, more particularly, to means for protecting mining equipment operators from overhead falls and the like. To this end, the apparatus of the present invention comprehends the provision of a unique mining safety device of the canopy/cab type which is directly securable to one side of a mining machine for providing a safe enclosure from which an operator may operate the machine.

Occupational safety considerations for mining equipment operators, although a perhaps somewhat neglected area in the past, has recently been elevated to a critical concern and has been the subject of much emphasis in the industry. This heightened interest in projecting mining equipment operators from such dangers as roof falls and rib and face falls as well as rib and face rolls may be attributable at least in part to various rather recently enacted statutory requirements regulating all aspects of mining safety. In turn, the statutory regulations can in large part be traced to the increased public awareness of the dangerous conditions under which the nation's miners have been working for some time.

One area of major emphasis within the industry has been in the development, for use with self-propelled underground coal mining equipment such as shuttle cars, of variously configured cab and canopy structures. These cab and canopies are typically located and installed along one side of the mining machinery in such a manner that when the operator is at the operating controls of the equipment he is protected from falls of roof, face or rib or from rib and face rolls. In this regard, a canopy has been defined as a structure which provides overhead protection against falls of roof whereas cabs conventionally comprehend structures which additionally provide lateral protection against falls of rib and face or rib and face rolls. Exemplary of such structures, is the protective canopy disclosed in U.S. Pat. No. 3,937,517 issued Feb. 10, 1976 to Donovan et al.

Prior art cabs and/or canopies generally have been substantially rigid structures permanently and non-yieldably affixed to the mining machine and constructed so as to have a structural capacity for supporting given minimum loads. Although adjustable structures of this type are known in the art, the adjustability features are normally characterized by means primarily intended for enclosure positioning purposes such as, for example, to accommodate such factors as the height of the mine seam and the operator's visibility and comfort. Among other reasons, the non-yieldable relation between such prior art cabs and/or canopies contributes to a reduced impact absorbing capability whereby adequate protection for the machine operator is not provided.

SUMMARY OF THE INVENTION

It is, in general, an object of the present invention to provide a safety enclosure directly securable to a mining machine for facilitating increased protection for the machine operator from overhead and lateral falls while operating the machine.

It is a further object of the present invention to provide a safety enclosure of the foregoing type which yieldably communicates with the mining machine to increase the enclosure's impact absorbing capabilities.

In accordance with these and other useful objects there is provided a safety enclosure yieldably securable to one side of an underground mining machine. The safety enclosure comprises a cage-like structure having at least three substantially rectangular tubular elements transversely stacked and interconnected at corresponding points along each side thereof to form a cube-like structure. A pair of longitudinally extending male slide members are vertically secured to and along one side of the cage-like structure and corresponding female channel members are secured to and along one side of a mining machine. The female channel members are vertically disposed along the side of the mining machine for slidably receiving the male slide members, and thereby the cage-like structure, and are configured for allowing vertical sliding displacement of the slide members while otherwise captively retaining them within the channels.

The slide and channel members each include a plurality of horizontally extending apertures for receiving a plurality of shear pins insertable through any coaxial aligned set of apertures in a channel member and its associated slide member. The shear pins normally maintain the slide members and cage-like structure adjustably disposed from the floor of the mine under normal operating conditions. However, in response to an overhead fall or the like causing a predetermined vertically downward force on the top of the cage-like structure, the pins shear allowing sliding displacement of the cage to the mine floor. After so absorbing the impact, the operator may safely remove himself from the unit, clean up the fall, raise the enclosure to its normal position and reinsert the shear pins to enable further operation of the mining machine.

BRIEF DESCRIPTION OF THE DRAWINGS

FIG. 1 is a semi-diagrammatic side elevation showing a typical mining machine, in particular a shuttle car, with the safety enclosure of the present invention attached thereto.

FIG. 2 is a perspective view of the safety enclosure of the present invention.

FIG. 3 is a fragmentary cross sectional view of a corner portion of the enclosure frame shown in FIG. 2.

FIG. 4 is a fragmentary cross sectional view taken along line 4—4 of FIG. 2.

FIG. 12 is a fragmentary plan view illustrating the male channel member shown in FIG. 10.

DESCRIPTION OF THE PREFERRED EMBODIMENTS

Figure 5:
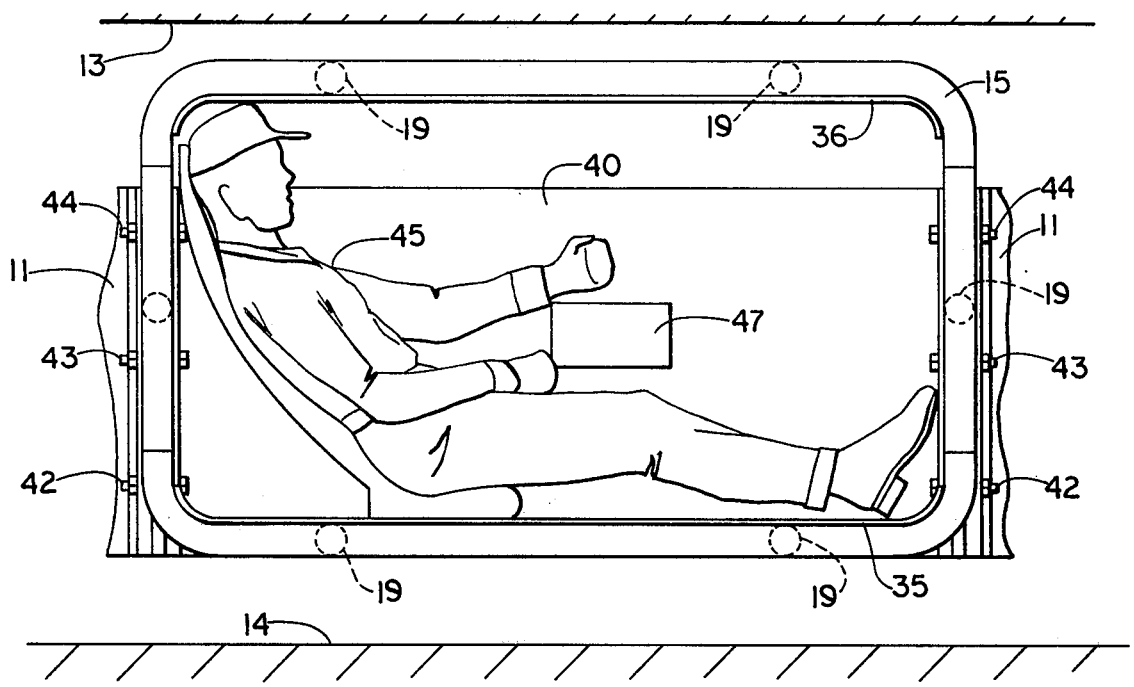
FIG. 5 is a fragmentary side elevation view showing the safety enclosure of the present invention in its normal operative position.

Referring now to the drawings, and in particular to FIG. 1, the safety enclosure of the present invention generally indicated at 10, is shown in association with a conventional underground coal mining shuttle car 11. It will be appreciated that although specifically illustrated in association with the shuttle car 11, the safety enclosure 10 is equally useful in connection with various other types of underground mining vehicles such as tractors, utility vehicles of various sorts and continuous mining machines. Therefore, the specific illustration in FIG. 1 of a shuttle car is not intended to be limiting but rather exemplary only of one type of mining machine with which the present invention is useful. Accordingly, the term "mining machine" as used herein and in the appended claims is intended to comprehend all types of vehicles and the like useful in underground mining situations. Furthermore, it will be understood that the safety enclosure 10 may also be useful with diverse types of surface mining equipment and other mobile machines, such also being intended to be included within the scope of the present invention.

Typically, the environment in which the mining machine 11 and safety enclosure 10 must operate comprises a low profile mine seam as illustrated at 12. Consequently, the safety enclosure 10 is also characterized by a low profile construction and is normally affixed to the mining machine 11 to provide adequate clearance from both the mine roof 13 and the mine floor 14. As will be explained in more detail hereinafter, the safety enclosure 10 is adapted to house the operator of the mining machine 11, as well as all of the controls necessary for the operation thereof, and includes means for providing both overhead and lateral protection in the case of roof, rib or face falls or other dangerous conditions. In particular, in response to an overhead fall of sufficient magnitude from the roof 13 of seam 12, the safety enclosure 10 is adapted to be automatically displaced to the floor 14 to facilitate absorption of the impact of the fall, thereby providing increased protection for the machine operator.

The detailed structure of the safety enclosure 10 is more specifically illustrated in FIGS. 2–4. It will therefrom be seen that the enclosure 10 comprises four substantially rectangular tubular elements 15, 16, 17 and 18 transversely stacked and interconnected at corresponding points by a plurality of relatively short transversely extending tubular elements 19. For example, each of the tubular elements 15, 16, 17, 18 and 19 may comprise two and a half inch double strength circular diameter steel pipe. Each of the rectangular elements 15, 16, 17, and 18 comprises four joined sections of equivalent cross sectional dimensions. For example, element 15 comprises a pair of opposed U-shaped tubular sections 20 and 21 joined together in abutting relationship by a pair of opposed linear tubular sections 22 and 23 at interfaces 24, 25, 26 and 27.

A convenient, although not limiting, method of joining the diverse sections of tubular elements 15, 16, 17 and 18 is illustrated in FIG. 3. Using abutting interface 26 as an example, a tightly fitting slug member 28 may initially be inserted partway into linear tubular element 23 and welded securely thereto at holes 29 and 30. Tubular element 20 is subsequently slid over the protruding portion of slug member 28 and also welded thereto at holes 31 and 32. Optionally, to further increase the strength of the joint, the entire circular abutting interface at 26 may be welded.

The interconnecting transverse tubular elements 19 may be joined to their respective rectangular elements 15–18 as illustrated in FIG. 4. It will be noted that each transverse element 19 is contoured at its distal ends corresponding to the circular configuration of tubular elements 15–18. The transverse elements are then fit snugly between their respective sections of tubular elements 15–18 and secured thereto be weldments such as illustrated at 33 and 34 in FIG. 4.

The basic superstructure of the enclosure 10 is finalized by the inclusion of a deck 35 and a roof or ceiling 36. Deck 35 and roof 36, which may comprise ¼ inch steel plate members, may be secured interiorly of the enclosure 10 by appropriately welding the plates to the tubular elements 15–19. Also, the deck 35 and the roof 36 may have arcuately formed terminations conforming to the interior curvature of the enclosure 10 at its four corners such as illustrated at 37.

Figure 6:
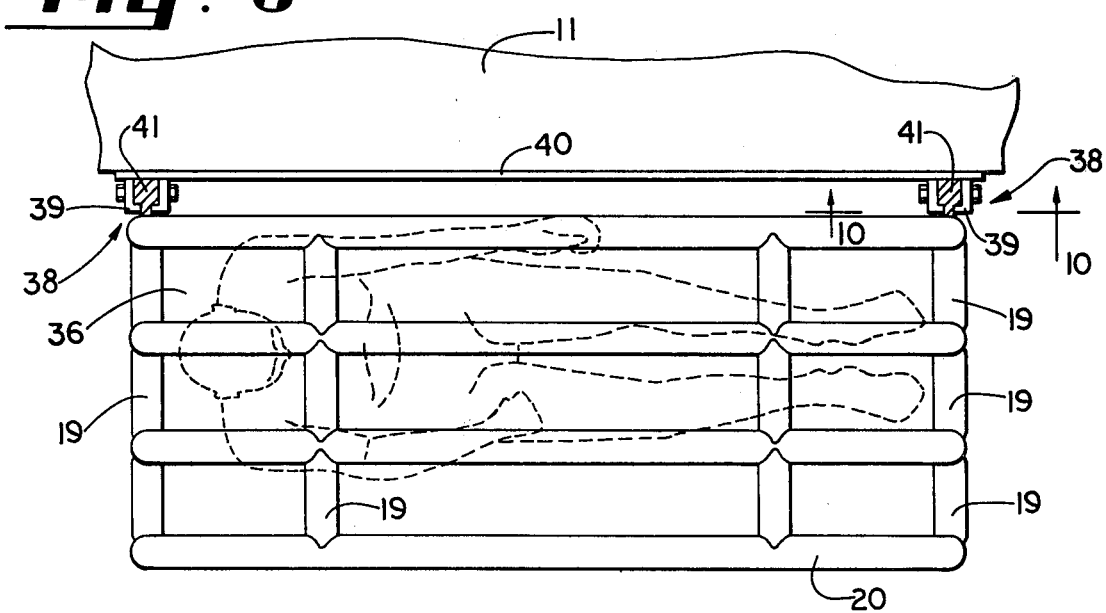
FIG. 6 is a fragmentary plan view of the safety enclosure of the present invention showing its attachment to a mining machine.

With additional reference to FIG. 6, it will be seen that the enclosure 10 is secured to the mining machine 11 by means of a pair of channel-slide assemblies generally shown at 38. Each of the channel-slide assemblies 38 comprises a longitudinal female channel member 39 vertically secured to one side of the mining machine 11. While in the drawings the channel members 39 are shown as being secured to a rear panel 40 which, in turn, is secured to the mining machine 11, it is also contemplated by the present invention and within the scope thereof to secure the channel members 39 directly to the mining machine 11. A pair of male slide members 41, slidably receivable by the channel members 39, are secured to, by welding or the like, the rearwardmost surfaces of the vertical sections or tubular element 18. Therefore, the slide members 41, which coessentially carry the enclosure 10, are vertically slidable within the channel members 39 to raise and lower the enclosure 10. Except for the facility of the slide members 41 for vertical sliding displacement within the channel members 39, the slide members 41 are otherwise held captive by the channel members 39 due to their respective cross sectional configurations.

In operation, the slide members 41, and therefore the enclosure 10, are vertically displaced within the channel members 39 so that the enclosure 10 assumes the approximate position shown in FIG. 1. To hold the enclosure 10 in place, a plurality of shear pins are horizontally passed through a series of coaxially aligned apertures in the channel members 39 and the slide members 41. Three such shear pins 42, 43 and 44 are shown in FIG. 2 along with their associated retaining nuts. Under normal conditions, the shear pins 42, 43, and 44 will hold the enclosure 10 in an operative position disposed above the floor 14 of the mine seam 12 as shown in FIG. 5. In this position, the machine operator 45, from an appropriate seat 46 or the like, may operate the mining machine 11 by means of a control box 47 remotely located within the enclosure 10. Inasmuch as the control box 47 is well known in the art and since a detailed description thereof is not necessary for an understanding of the present invention, a detailed description thereof is not provided herein. If, for any reason, such as operator visibility or seam height consideration, it is necessary to raise or lower the enclosure 10 relative to the mining machine 11, such can simply be accomplished by removing the shear pins, readjusting the vertical position of the slide members 41 in the channel members 39 until appropriate ones of the apertures in the slide-channel assembly 38 are coaxially aligned and then reinserting the shear pins.

Figure 7:
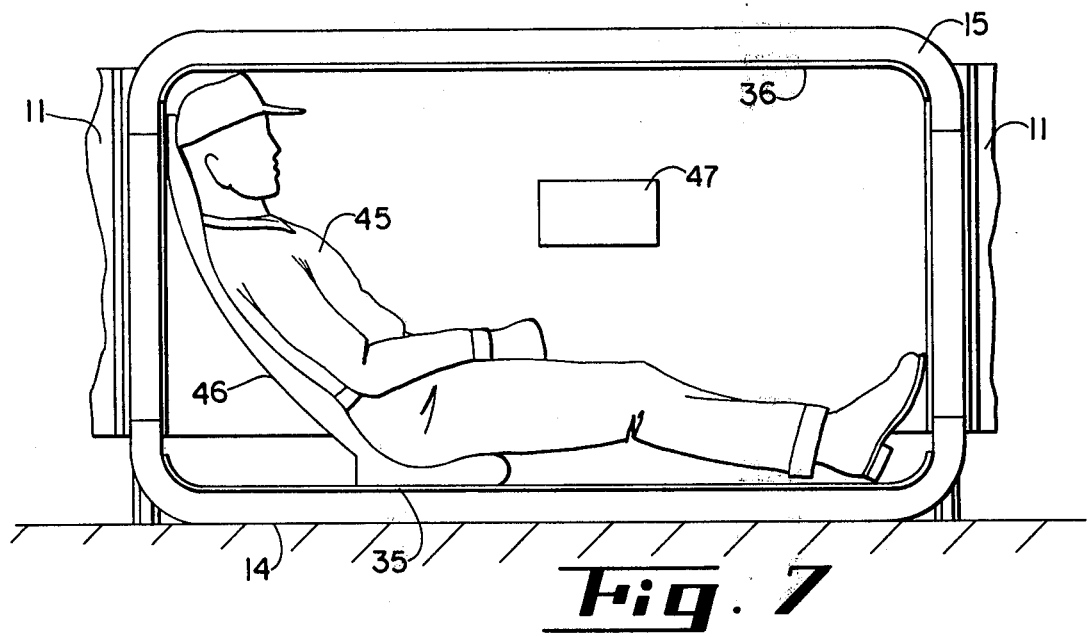
FIG. 7 is a fragmentary side elevation view showing the safety enclosure of the present invention in its lowered or inoperative position on the floor of a mine.

Upon the occurrence of an overhead fall from the roof 13 of the seam 12 of such magnitude as to cause the pins 42, 43 and 44 to shear, the slide members will automatically lower the enclosure 10 to the floor 14 as shown in FIG. 7. This action will tend to absorb some of the impact of the fall and provide increased protection for the machine operator 45. The roof 36 of the enclosure 10 will of course tend to protect the machine operator 45 from any fragmentary portions of the fall. In the preferred embodiment of the present invention, a fall creating a downward force on pins 42-43 of 22,000 pounds in necessary to shear the pins. After the fall has subsided, the operator 45 may safely remove himself from the enclosure 10, clean up the debris, and reestablish the enclosure 10 in its operative position as previously explained herein.

Figure 14:
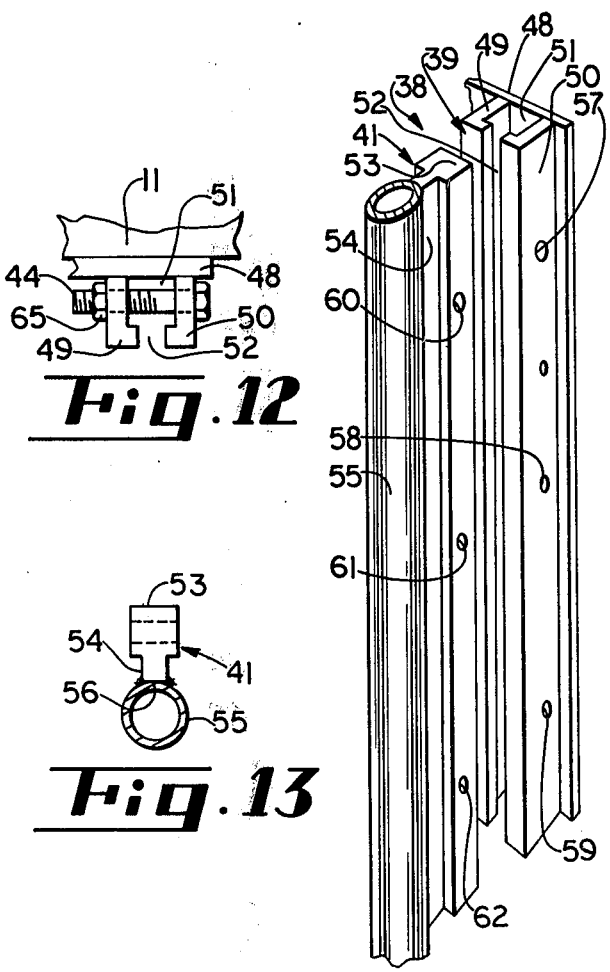
FIG. 14 is an exploded perspective view of the slide-channel assembly of the safety enclosure of the present invention.

The detailed construction of the slide-channel assemblies 38 are shown in more detail in FIGS. 10 through 14. The female channel member 39 includes a rear plate 48 which may comprise the rear panel 40 illustrated in FIG. 2 or, alternatively, a member of substantially lesser extent as illustrated in FIG. 14. Extending from the plate 48 are a pair of vertically disposed longitudinal angle members 49 and 50 defining a channel 51 therebetween. The angle members 49 and 50 are spaced one from the other for defining a vertically extending opening 52 of smaller cross sectional dimension than channel 51.

The slide member 41 comprises a first rectangular portion 53 snugly yet slidably receivable within channel 51 of channel member 39 and a second projecting portion 54 receivable within opening 52. Therefore, due to the larger cross sectional dimension of portion 53 relative to opening 52, the slide member 41 is held captive within the channel member 39 while being vertically slidable therein. And, since portion 54 of the slide member 41 is secured to the vertical tubular section 55 of rectangular element 18, such as by welding as shown at 56, the slide member 41 will carry the enclosure 10 coessentially therewith.

Figures 10, 11:
FIG. 10 is a fragmentary side elevation view, partly in cross section, taken along line 10—10 of FIG. 6 and illustrating the slide-channel assembly of the safety enclosure of the present invention.
FIG. 11 is a fragmentary cross sectional view taken along line 11—11 of FIG. 10.

The angle members 49 and 50 of the channel member 39 include a series of coaxially aligned aperture pairs extending therethrough, only the apertures 57, 58 and 59 extending through angle member 50 being illustrated. Similarly, portion 53 of the slide member 41 includes a series of apertures 60, 61 and 62 vertically spaced to align with the apertures in the channel member 39. After positioning the slide member 41 relative to the channel member 39 so that a desired set of apertures coaxially align, a shear pin is inserted into and through each set of three aligned apertures. In FIG. 10, for example, three shear pins 42, 43 and 44 are illustrated as extending through coaxially aligned apertures in the channel member 39 and the slide member 41. The shear pins 42, 43 and 44, which lock the slide member 41 in position relative to the channel member 39, may be fastened to the channel slide assembly 38 by means of nuts 63, 64 and 65 or the like. In addition, a grease fitting 66 may be included to facilitate the application of a suitable lubricant into the channel 51.

Figure 8:
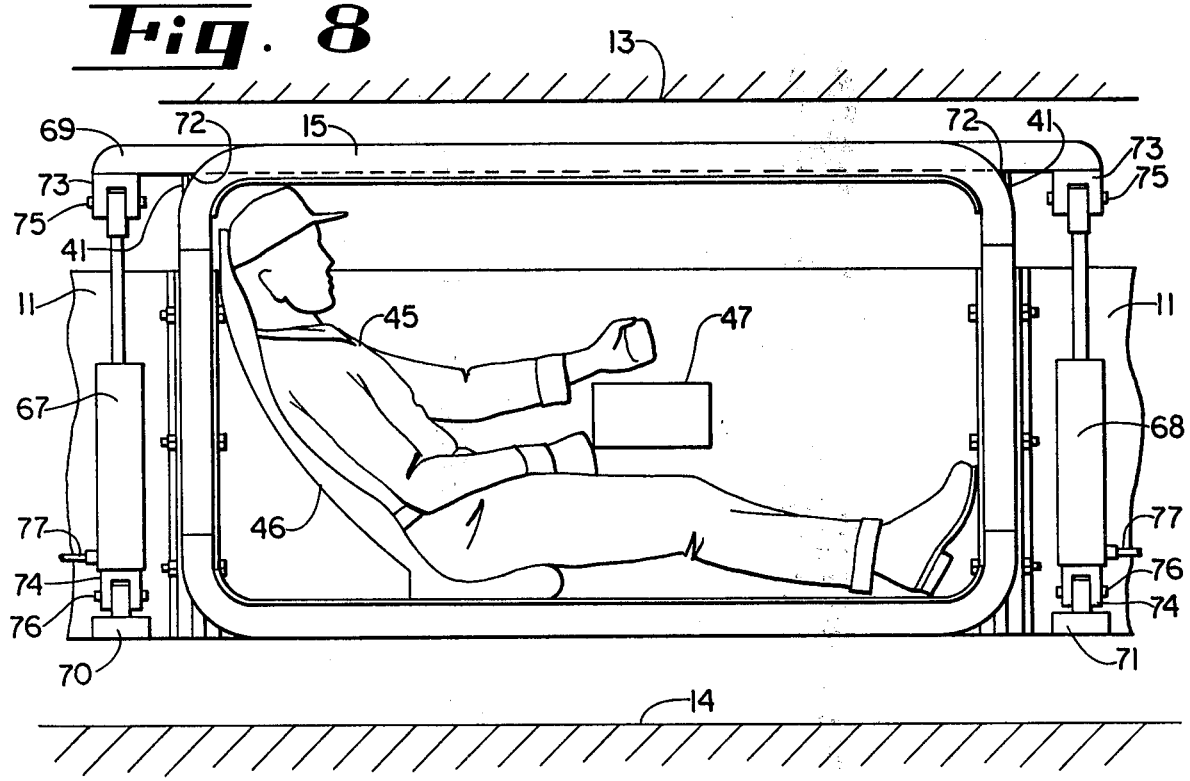
FIG. 8 is a fragmentary side elevational view illustrating the safety enclosure of the present invention including a pair of hydraulic jacks.

With reference to FIG. 8, the basic safety enclosure 10 of the present invention is illustrated as being in its operative position raised above the floor 14 of seam 12 and as including a pair of laterally spaced spring loaded hydraulic cylinder or jack assemblies 67 and 68. The jack assemblies 67 and 68, which may comprise any of a number of suitable and well known extensible hydraulic cylinder assemblies, extend vertically intermediate a horizontally disposed jack support bar 69 and a pair of respective seat members 70 and 71. Preferably, the jack support bar 69 is disposed intermediate the side of the mining machine 11 and the rectangular tubular element 18 and is disposed above the deck 35 so as to be in substantial alignment with the upper horizontal sections of rectangular tubular elements 15–18. Inwardly from its distal ends the jack support bar 69 is secured to, such as by welding or the like, the male slide members 41 such as at 72. Jack assemblies 67 and 68 may be secured intermediate the jack support bar 69 and the seat 70 and 71 in the position described by respective laterally disposed upper and lower supports 73 and 74 pivotally affixed to the jack assemblies 67 and 68 by upper and lower pivot pins 75 and 76.

As previously described, in the case of an overhead fall or the like the safety enclosure 10 will be automatically lowered to the floor 14 of the seam 12 to facilitate absorption of the impact. The spring loaded jack assemblies 67 and 68, in addition to supplementing this impact absorbing facility, are useful in raising the enclosure 10 to its operative position after the fall has been cleaned up. This is accomplished by supplying fluid power to the jacks 67 and 68 through fittings 77 which, by means of the integral connection between the support bar 69 and the enclosure 10 through the slide members 41, causes the enclosure 10 to be raised relative to the mining machine 11.

Figure 9:
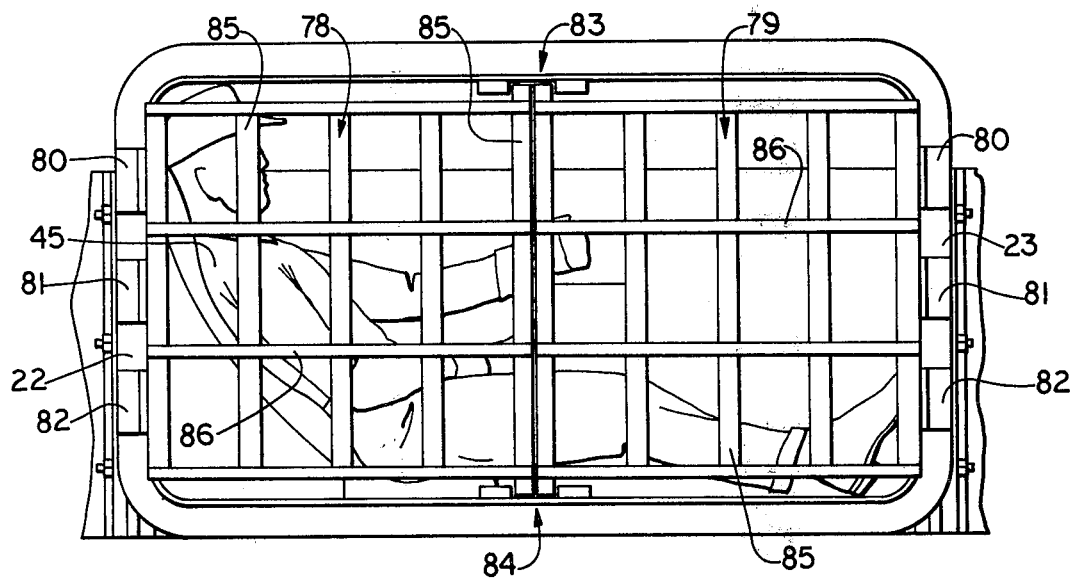
FIG. 9 is a fragmentary side elevation view similar to FIG. 5 showing the safety enclosure of the present invention including a hinged side double door.
Figure 13:
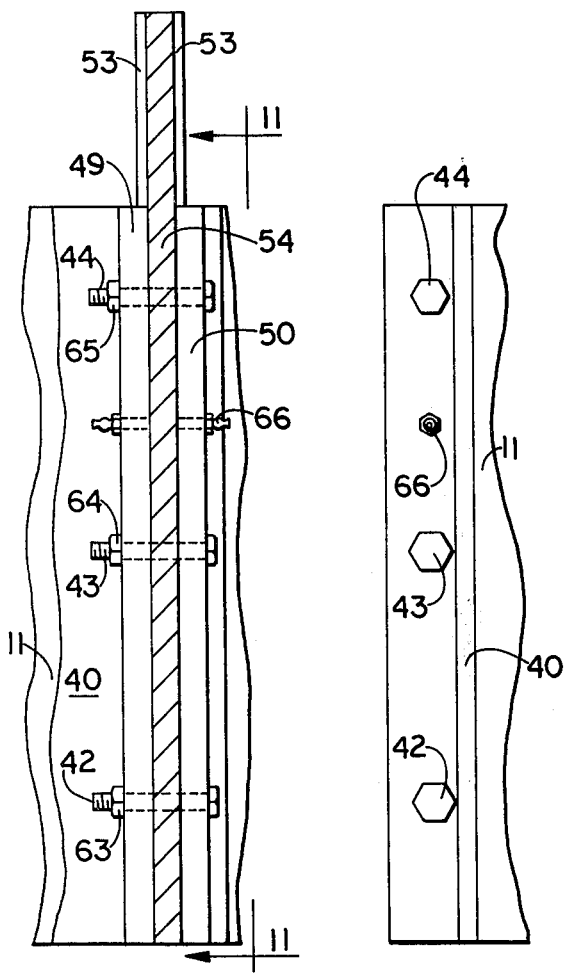
FIG. 13 is a fragmentary plan view illustrating the female slide member shown in FIG. 10.

In order to provide lateral protection for the machine operator 45, the safety enclosure 10 is modified in FIG. 9 to include a pair of swingable side doors generally shown at 78 and 79. Each of the side doors 78, 79 is pivotally connected to, respectively, vertical sections 22 and 23 of rectangular tubular element 15 by a series of hinges 80, 81 and 82. In addition, means for locking the double door assembly 78, 79 in a closed position as illustrated in FIG. 9 may be provided as generally indicated at 83 and 84. Preferably, the doors 78, 79 each comprise a series of vertical and horizontal bars 85 and 86 respectively, joined such as be welding or the like at their intersections. It has been found that 1 inch by 1 inch steel bars will provide adequate lateral protection against falls of rib and face or rib and face rolls.

Although the invention has been shown in connection with a certain specific embodiment, it will be readily apparent to those skilled in the art that various changes in form and arrangement of parts may be made to suit requirements without departing from the spirit and scope of the invention.

The embodiments of the invention in which an exclusive property or privilege is claimed are defined as follows:

1. In a mining machine or the like, improved safety apparatus for protecting the operator thereof from overhead falls and the like comprising:
   a. a cage-like enclosure for receiving and surrounding said operator while operating said machine;
   b. means in association with said machine and said cage-like enclosure for securing said cage-like enclosure to one side of said machine and for allowing sliding displacement of said cage-like enclosure relative to said machine in a vertical direction;

c. means for adjustably maintaining said cage-like enclosure at a predetermined distance above the floor of said mine, said latter mentioned means being adapted to release said cage-like enclosure for sliding displacement to the floor of said mine in response to an overhead fall causing a predetermined force on the top of said cage-like enclosure.

2. In a mining machine or the like, improved safety apparatus for protecting the operator thereof from overhead falls and the like, said improved safety apparatus comprising a cage-like enclosure for receiving and surrounding said operator while operating said machine, means in association with said machine and said cage-like enclosure for securing said cage-like enclosure to one side of said machine and for allowing sliding displacement of said cage-like enclosure relative to said machine in a vertical direction, said securing means comprising at least one male mating member having a longitudinally extending slide vertically secured to said cage-like enclosure and a corresponding female mating member secured to said one side of said machine, said female member having a vertically disposed longitudinal channel for receiving said slide, said longitudinal channel being configured for allowing said vertical sliding displacement of said slide therein and for otherwise captively retaining said slide, and means for adjustably maintaining said cage-like enclosure at a predetermined distance above the floor of said mine, said latter mentioned means being adapted to release said cage-like enclosure for sliding displacement to the floor of said mine in response to an overhead fall causing a predetermined force on the top of said cage-like enclosure.

3. The improved safety apparatus according to claim 2, wherein said slide and channel each include a plurality of apertures extending horizontally therethrough and wherein said means for adjustably maintaining comprises a plurality of shear pins insertable through any coaxially aligned set of apertures in said channel and slide for normally maintaining said slide and cage-like enclosure disposed from the floor of said mine, said shear pins being shearable by said slide for allowing sliding displacement of said cage-like enclosure to the floor of said mine in response to an overhead fall causing a predetermined vertically downward force on the top of said cage-like enclosure.

4. The improved safety apparatus according to claim 3 wherein said cage-like enclosure comprises at least three substantially rectangular tubular elements disposed in parallel spaced relationship and transversely stacked and interconnected at corresponding points along each side to form a cube-like structure having opposed open front and rear sides said rear side being disposed adjacent said one side of said machine.

5. The improved safety apparatus according to claim 4 wherein said at least three substantially rectangular tubular elements are interconnected by a plurality of transversely extending tubular elements secured between said corresponding points along each side of said at least three substantially rectangular tubular elements.

6. The improved safety apparatus according to claim 4 including a pair of side doors hingedly secured to the vertical sections of the one of said rectangular tubular elements adjacent said front side and being swingable toward said machine to a locked position abutting one another in a plane substantially parallel to said rectangular tubular element.

7. The improved safety apparatus according to claim 8 including at least one vertically disposed hydraulic jack assembly having support means secured to said male mating member, said jack assembly including means for engaging the floor of said mine for allowing said enclosure to be raised relative to said machine in response to applying fluid power to said jack assembly.

* * * * *